(No Model.) 3 Sheets—Sheet 1.

J. N. BRIGGS.
GAGE FOR TEETH OF ICE PLOWS AND MARKERS.

No. 598,240. Patented Feb. 1, 1898.

Witnesses:
J. W. Fisher.
Fred. J. Lawrence.

Inventor,
John N. Briggs.
by William H. Low,
Attorney.

THE NORRIS PETERS CO., PHOTO-LITHO., WASHINGTON, D. C.

(No Model.) 3 Sheets—Sheet 2.
J. N. BRIGGS.
GAGE FOR TEETH OF ICE PLOWS AND MARKERS.
No. 598,240. Patented Feb. 1, 1898.
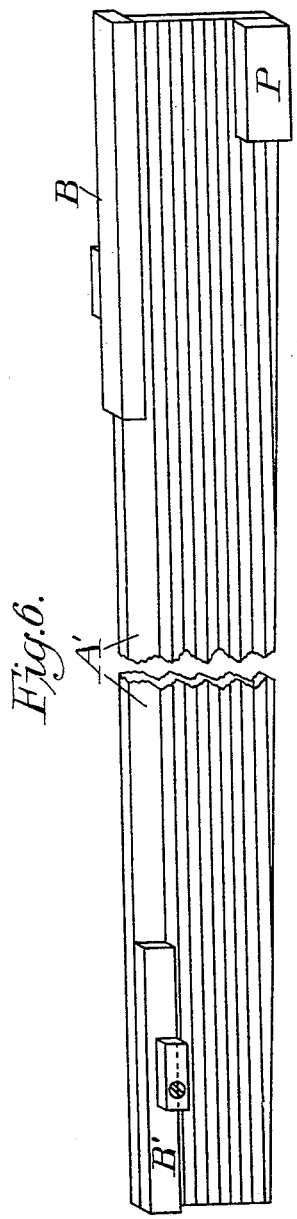
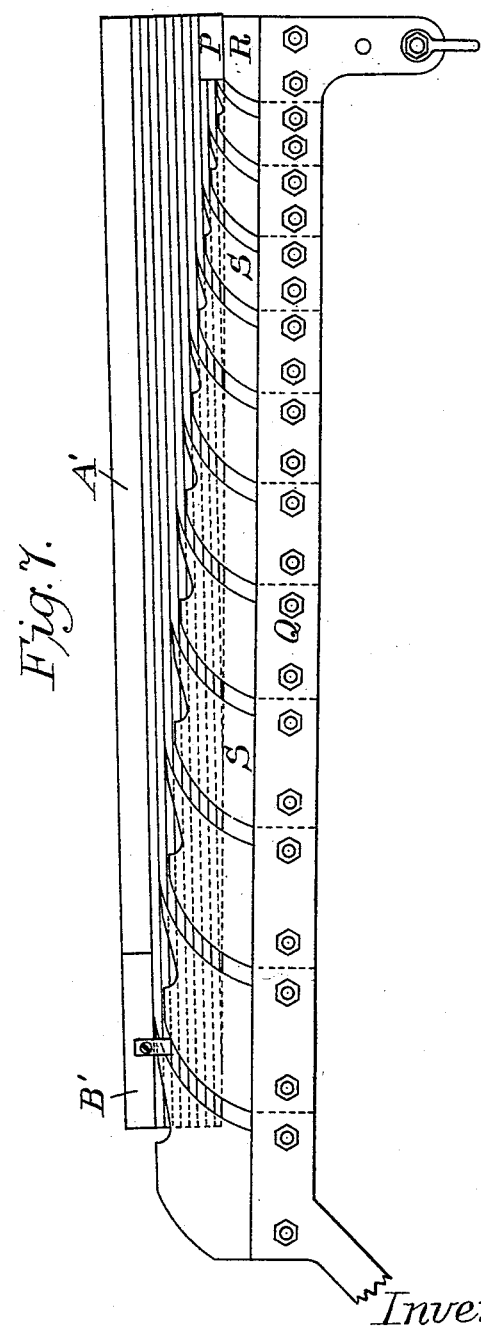
Witnesses:
J. W. Fisher
Fred. J. Lawrence
Inventor,
John N. Briggs.
by William H. Low
Attorney.

(No Model.) 3 Sheets—Sheet 3.
J. N. BRIGGS.
GAGE FOR TEETH OF ICE PLOWS AND MARKERS.
No. 598,240. Patented Feb. 1, 1898.
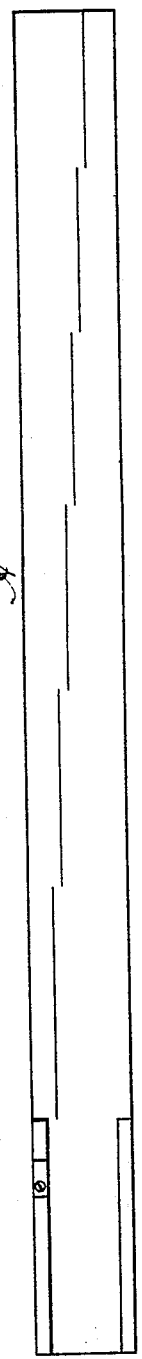
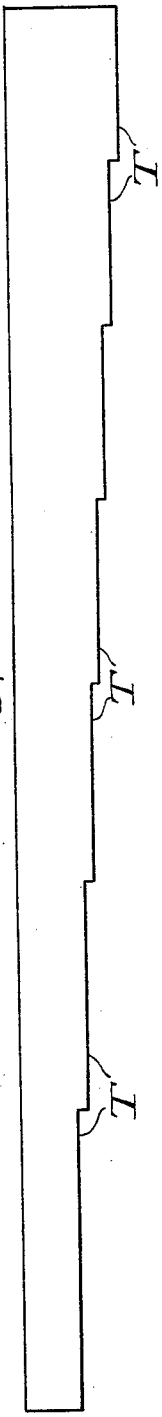
Witnesses:
J. W. Fisher.
Fred. J. Lawrence.
Inventor,
John N. Briggs.
by Williams & Low
Attorney.
THE NORRIS PETERS CO., PHOTO-LITHO., WASHINGTON, D. C.

United States Patent Office.

JOHN N. BRIGGS, OF COEYMANS, NEW YORK.

GAGE FOR TEETH OF ICE PLOWS AND MARKERS.

SPECIFICATION forming part of Letters Patent No. 598,240, dated February 1, 1898.

Application filed January 12, 1897. Serial No. 618,984. (No model.)

*To all whom it may concern:*

Be it known that I, JOHN N. BRIGGS, of Coeymans, in the county of Albany and State of New York, have invented new and useful Improvements in Gages for the Teeth of Ice Plows and Markers, of which the following is a specification.

This invention relates to certain improvements in gages for determining the proper relative height of the cutting-points and the heels of the several cutter-teeth of ice plows and markers used for grooving fields of ice preparatory to the operation of separating the ice into cakes for storing and other purposes; and it consists of appliances herein shown and described, and particularly set forth in the claims, which form part of this specification.

Figure 1:
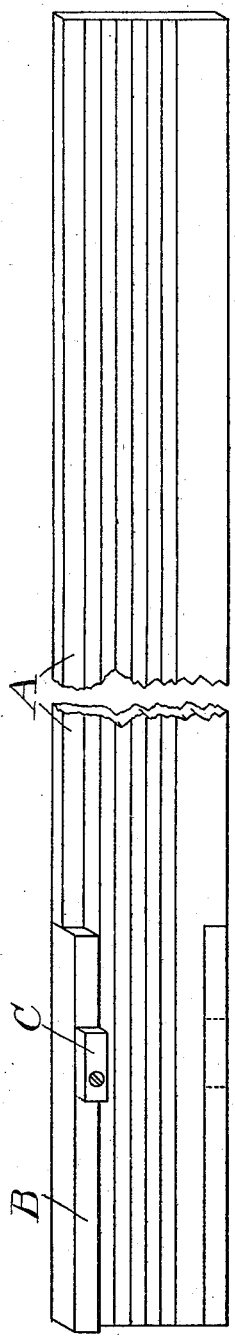
Figure 2:
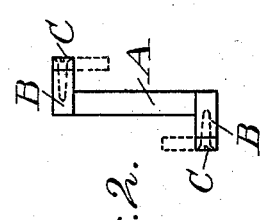
Figure 3:
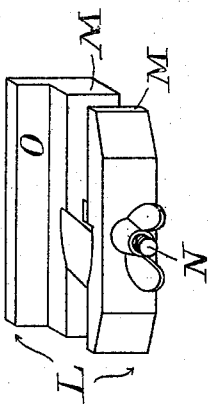
Figure 5:
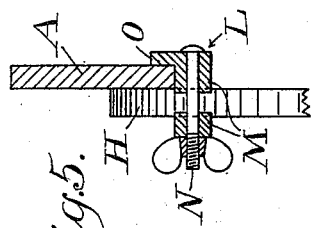
Figure 4:
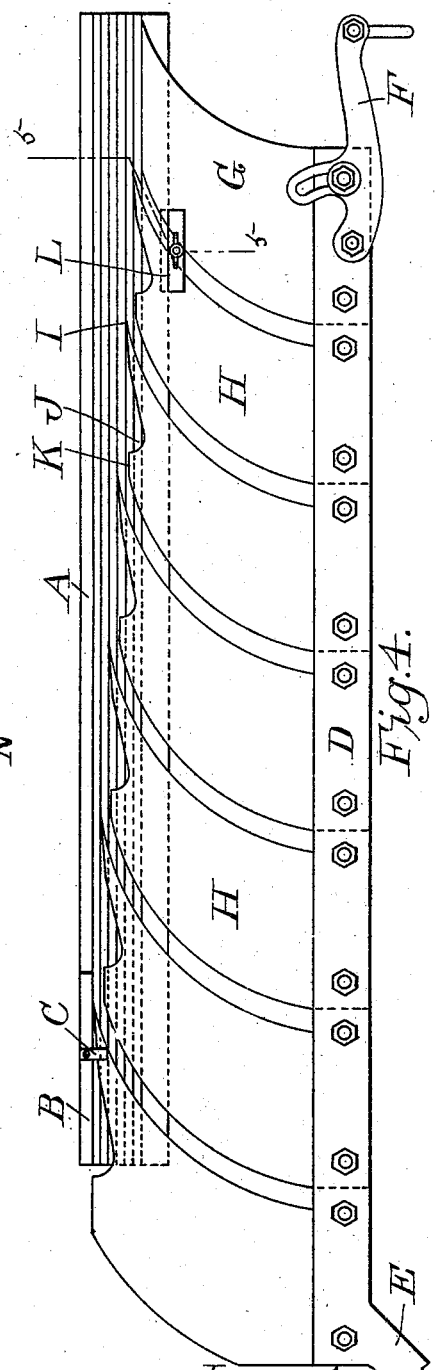

In the accompanying drawings, which are herein referred to and form part of this specification, Figure 1 is a side elevation of one of my gages adapted for use on an ice-plow provided with six cutter-teeth; Fig. 2, an end elevation of the same; Fig. 3, a perspective view of a detachable gage-supporter adapted to be fastened temporarily to adjacent cutter-teeth of an ice-plow for the purpose of supporting one end of my gage; Fig. 4, a side elevation of an ice-plow in an inverted position, showing the manner of applying my gage to use; Fig. 5, a vertical section of Fig. 4 at the line X X; Fig. 6, a side elevation of my gage adapted for use on a marker used for scoring a field of ice preparatory to grooving the latter with an ice-plow; Fig. 7, a side elevation of a marker in an inverted position, showing my gage applied thereto; and Figs. 8 and 9, side elevations of modified forms of my gage.

As represented in the drawings, A designates my gage adapted to use on an ice-plow having six cutter-teeth. Said gage is usually made of a strip of suitable light wood in the form of a rectangular parallelogram of a length and width suited to the purpose, and preferably each of said gages is adapted for use on two different plows which have a different number of cutter-teeth—that is to say, one face of said gage is ruled to suit a plow having a certain number of teeth and its opposite face is ruled to suit a plow having a different number of teeth—and to avoid a confusion of the lines on its opposite faces the gage should be made of a non-transparent material that is practically infrangible, so as to avoid the danger of its being shattered in the event of its falling, and under such conditions said gage should be adapted to be used with either edge uppermost, according to the number of cutter-teeth in a plow.

One end of my gage is provided with lips B, formed at opposite edges and arranged to extend from opposite faces of the gage A, as shown in Fig. 2, and each of said lips has a tongue C pivoted thereto to swing downward, as indicated by dotted lines in Fig. 2, so as to engage with a tooth of the ice-plow on which the gage is used. Each face of the gage is preferably provided with a series of parallel straight lines, whose number must equal the number of teeth of the ice-plow on which the gage is to be used, and an additional line which ranges in line with the face of the headland G and is only used, as hereinafter explained, as a base-line to set the gage by. The other lines, which are spaced equidistantly, according to their number, will indicate the level to which the corresponding cutter-teeth of the plow should have their cutting-points finished.

The gage A (shown in Fig. 1) is designed for an ice-plow having six cutter-teeth, and consequently has six gage-lines and a base-line.

Fig. 4 shows an ice-plow, which is an old and well-known construction and forms no part of my invention. Said ice-plow consists of a beam D, formed of two bars of flat iron, and it is provided with the usual handles E, which are shown as broken off in the drawings. The foremost end of the beam D has a clevis F, by which one or more animals can be hitched to the ice-plow. At the foremost part of the beam D there is a headland G, which, as well as the cutter-teeth, is secured between the bars of the beam D. Said headland, which is not a cutter-tooth, is only designed to bear upon the surface of the ice-field or at the bottom of a groove previously cut by the ice-plow. Following immediately after said headland there is a series of cutter-teeth H, which while having the same general form vary in size and their pendency from the beam D. The only difference between them being one of degree, a description of one will serve as a description of all of them. The foremost end of each cutter-tooth H has a chisel-shaped cutting-point I, that is adapted to cut a groove in the ice. At the lower end of said cutter-tooth, immediately following said cutting-point, is a depression J, followed by a plane K, which is level or approximately level, and is commonly known as the "heel" of the tooth; L, a gage-supporter that is temporarily attachable to two adjacent cutter-teeth for the purpose of holding one end of the gage A, as shown in Fig. 4. Said gage-supporter consists of two jaws M, of approximately similar form, and a clamping-bolt N, which passes through said jaws and is arranged to draw the latter toward each other in order to secure the gage-supporter upon the teeth of an ice-plow. One of said jaws is provided with a longitudinal standing flange O, which, in conjunction with an adjacent side of the cutter-teeth to which said gage-supporter is secured, will form a groove in which the lower edge of the gage A will enter loosely and wherein the gage A will repose while an operative is observing the levels of the several parts in respect to the lines of the gage; but it should be understood that the gage can be removed from the supporter without removing the latter from the cutter-teeth. The relative positions of the gage-supporter, gage, and cutter-teeth are as shown in Fig. 5, and by this arrangement the gage can be removed as frequently as may be required without disturbing the gage-supporter, and the latter only needs to be removed after the several parts are brought to their respective levels.

My gage A is used in the following manner: Select a gage that is marked to correspond to the number of cutter-teeth contained in the ice-plow to be operated upon. Invert the ice-plow to bring the cutter-teeth H uppermost, as shown in Fig. 4. Secure the gage-supporter L to two adjacent cutter-teeth with the bolt N passing through the space between said teeth. Fix the gage A against the side of the cutter-teeth H, so that the lip B will bear upon the cutting-point I of the last cutter-tooth, but not so as to rest upon the heel of the latter, with the tongue C swung down, as shown in Fig. 4, to retain the gage in its place. The gage-supporter L should then be adjusted so that the base-line of the gage A will correspond to the height of the headland G. Then by applying a straight-edge to the under side of the lip B and extending it rearwardly by the side of the heel K of the last cutter-tooth H it can be quickly determined whether said heel is at its required height, and if it is not it should be corrected by filing away the excessive portion of the last cutter-tooth and the headland G brought into accord with the base-line of the gage A. The cutting-points I of the other several cutter-teeth H should be filed to accord with the several lines of the gage A, and it should be understood that while the headland G, the cutting-points I of the several cutter-teeth, and the heel K of the last cutter-tooth should each be finished to accord with the corresponding line of the gage A, the heel K of each of the other cutter-teeth, excepting the last one, should preferably be finished slightly below the corresponding line on said gage, so as to obtain the most perfect operation of the ice-plow. Heretofore the cutting-points of the cutter-teeth of ice-plows have been brought into line by filing them to a true line, as determined by a straight-edge, and the position of the heel and face of each tooth was determined by means of a short gage of a length but little longer than that of the lower end of one tooth. The operation of correctly filing the teeth was complicated and generally very unsatisfactory.

By means of my invention an operative can determine at a single glance the position of the cutting-point, face, and heel of each and every cutter-tooth of an ice-plow, and the work of correcting them, if wrong, is rendered very simple.

In the modification of my invention represented in Figs. 6 and 7, which show my gage as adapted to the teeth of "markers" or implements for marking a field of ice into squares preparatory to the operation of separating the cakes of ice by means of an ice-plow, A', designates my gage, which is preferably made slightly tapering in its width, the narrower end being provided with a lip B', which is arranged in like manner and is used for the same purpose as the lip B of the gage A, as hereinbefore described. The wider end of said gage is provided with a stop P, which is adapted to rest upon the upper edge or face of the headland when the marker is inverted, as shown in Fig. 7, and at the same time the inner end of said stop will bear against the cutting-point of the first cutter-tooth of the marker. The gage A' is ruled with a series of lines which are parallel with the base-line of the gage and which equal the number of cutter-teeth of the marker on which it is to be used. The upper line of the gage A' should range in line with the lower face of the lip B', and it will indicate the proper height of the cutting-point and heel of the last cutter-tooth. The other lines will determine the height of the cutting-points of the other cutter-teeth when the number of the line corresponds to the number of the tooth to be treated. The heel of each cutter-tooth, excepting the heel of the last cutter-tooth, should be finished slightly below the line for the cutting-point of the same cutter-tooth.

Fig. 7 shows an old and well-known form of marker in an inverted position and having my gage A' fixed in place thereon. Said marker is preferably provided with a greater number of cutter-teeth than an ice-plow. As shown in Fig. 7, Q designates the beam of said marker, which is made substantially in the manner hereinbefore described in respect to the beam D of the ice-plow shown in Fig. 4; R, the headland of said marker, and S the cutter-teeth of the same.

The manner of applying my gage A' only differs from the manner of using the gage A, hereinbefore described, by fixing the gage A' upon the marker so that the lower face of the stop P will rest upon upper face of the headland R and the inner end of said stop bearing against the cutting-point of the first cutter-tooth S, and if the cutting-points of the cutter-teeth are not in agreement with the lines of said gage the cutting-point of the last cutter-tooth must be filed away until the heel and cutting-point of the last cutter-tooth will conform to the upper line of the gage A'. The several lines of the latter will indicate the level to which the cutting-points of the other cutter-teeth should be finished, and the proper heights of said cutting-points should be determined as hereinbefore described in respect to the gage A.

In the modification of my invention shown in Fig. 8 the gage $A^2$ only differs from the gage A by having the gage-lines broken into lengths that will conform to the horizontal length of a cutter-tooth that should correspond to the position of said gage-line, the gage-lines being arranged in position to suit the proper position of the several cutter-teeth. The manner of using the gage $A^2$ is identical with the manner of using the gage A, and therefore a description of the same is unnecessary.

In the modification of my invention shown in Fig. 9 the gage $A^3$ is not provided with the parallel lines shown in the other forms of my invention, but its lower edge is provided with a series of steps or levels T, that conform in length, level, and position to the several cutter-teeth of an ice plow or marker on which the gage is to be used.

The manner of using the gage $A^3$ differs from that of using my gages hereinbefore described, as it is designed to have its lower or stepped edge bear directly upon the upper edge of the headland and cutter-teeth of an ice plow or marker while either of the latter is in an inverted position, and thereby the proper level of the face of the headland, the cutting-point, and the heel of each cutter-tooth can be quickly and correctly determined.

While the accompanying drawings show my invention as adapted to use on ice-plows which contain six cutter-teeth, it should be understood that without further invention it can be adapted to use on ice-plows having any number of cutter-teeth over two of said teeth, and for indicating the level of the cutting-points of any two teeth of an ice-plow containing any number of cutter-teeth greater than two, and my invention includes such constructions when applied to either stationary or adjustable cutter-teeth.

What I claim as my invention, and am desirous of securing by Letters Patent, is—

1. The herein-described gage for the relative levels of the headland and of the cutting-points of the teeth of ice-grooving implements; said gage consisting of a strip of non-transparent and infrangible material having—on one or both of its faces—a series of longitudinal parallel lines—or the equivalent means herein set forth—for indicating the relative levels of the headland and of the cutting-points of the teeth, and a tongue pivoted to said gage and adapted to loosely retain the gage on the side of the cutter-teeth; said gage being detachable from said cutter-teeth so as to allow the filing of the latter, as specified.

2. A gage for determining the proper relative levels for the headland and for the cutting-points of the cutter-teeth of ice-grooving implements; the same consisting of a strip of non-transparent infrangible material provided with a series of equidistantly-spaced longitudinal parallel lines arranged to indicate the proper levels for the heel of the last cutter-tooth and for the cutting-points of two or more adjacent cutter-teeth; said gage having a longitudinal lip, B, extending laterally therefrom and adapted to rest loosely upon the edge of a cutter-tooth, and having a tongue, C, pivoted to said lip so as to be swung downward at the side of a cutter-tooth on which the gage loosely rests; said tongue being adapted to steady the gage in place on the ice-grooving implement, as specified.

3. A gage for the cutter-teeth of ice-grooving implements, consisting of a strip of non-transparent infrangible material provided with a series of parallel longitudinal lines arranged to indicate the required relative levels of the headland and of the cutting-points of two or more adjacent teeth; said gage being without transverse lines or figures to mark such indices, in combination with a tongue pivoted to said gage and adapted to loosely hold the gage beside the cutter-teeth of the implement, as herein specified.

4. A gage for the teeth of ice-grooving implements, the same consisting of a strip or plate of suitable material provided with a series of parallel lines arranged to indicate the level of the cutting-points of two or more cutter-teeth and having a lateral lip adapted to rest upon the upper face of one of said teeth, as herein specified.

5. The combination, with a gage, A, provided with a lateral lip, B, that is adapted to rest upon the cutting-point of one of the cutter-teeth of the implement, of an adjustable clamp, fitted to clamp upon the cutter-teeth and adapted to support one end of said gage in position, as herein specified.

6. A gage-supporter, L, attachable to cutter-teeth of ice-grooving implements and consisting of a pair of movable jaws, M, having adjacent flat faces which are parallel to each other, and a bolt, N, that is adapted to draw said jaws toward each other; one of said jaws being provided with a longitudinal standing flange, O, at the outer edge of its upper face arranged to form—in conjunction with the adjacent face of the cutter-tooth to which the supporter is attached—a longitudinal groove in which the gage will rest loosely and from which it may be removed without disturbing the gage-supporter, as herein specified.

JOHN N. BRIGGS.

Witnesses:
    WM. H. LOW,
    G. W. BARRETT.